United States Patent [19]

Hirano et al.

[11] Patent Number: 6,090,959
[45] Date of Patent: Jul. 18, 2000

[54] METHOD OF PRODUCING FATTY ACID LOWER ALKYLESTER FROM FAT AND OIL

[75] Inventors: Takenori Hirano, Izumi; Keiichi Tsuto, Kyoto, both of Japan

[73] Assignee: Lonford Development Limited, Kyoto, Japan

[21] Appl. No.: 09/146,166

[22] Filed: Sep. 3, 1998

[30] Foreign Application Priority Data

May 25, 1998 [JP] Japan .................................. 10-143331
Aug. 25, 1998 [JP] Japan .................................. 10-239215

[51] Int. Cl.$^7$ ......................................................... C11C 3/00
[52] U.S. Cl. ................................................................ 554/169
[58] Field of Search ............................................... 554/169

[56] References Cited

FOREIGN PATENT DOCUMENTS

| | | |
|---|---|---|
| 62-218495 | 9/1987 | Japan . |
| 6-313188 | 11/1994 | Japan . |
| 7-197047 | 8/1995 | Japan . |
| 7-310090 | 11/1995 | Japan . |

*Primary Examiner*—Deborah D. Carr
*Attorney, Agent, or Firm*—Oblon, Spivak, McClelland, Maier & Neustadt, P.C.

[57] ABSTRACT

In a method of producing a fatty acid lower alkylester according to the invention, a fat & oil and a lower alcohol are caused to react with each other in the presence of a catalyst, in which triglyceride contained in the fat & oil undergoes a transesterification. The catalyst to be used in the reaction is a solid basic catalyst consisting essentially of a potassium compound and iron oxide, of a calcium compound and iron oxide, or of a potassium compound and zirconium oxide. It is possible to produce the fatty acid lower alkylester at a high reaction efficiency by this method as well as to simplify or eliminate the need of catalyst separation and recovery processes.

6 Claims, No Drawings

METHOD OF PRODUCING FATTY ACID LOWER ALKYLESTER FROM FAT AND OIL

BACKGROUND OF THE INVENTION AND RELATED ART STATEMENT

The present invention relates to a method of producing a fatty acid lower alkylester which can be effectively used as a fuel oil for diesel engines, for instance, through a transesterification of triglyceride contained in a variety of fats and oils, such as rape oil, sesame oil, soybean oil, corn oil, sunflower oil, palm oil, palm kernel oil, coconut oil and safflower oil, in particular, waste edible oils that were spent, with an alcohol.

Large quantities of edible fats and oils as mentioned above are used. Although a certain part of spent oils (aforementioned waste edible oils) is recycled as a raw material for producing soap, for example, they are mostly burned together with other combustible wastes or disposed in landfills together with incombustible wastes in actuality.

It has conventionally been known that a fatty alkylester could be obtained by subjecting any of monoglyceride, diglyceride and triglyceride, major constituents of plant oils, to a transesterification with an alcohol (Handbook of Organic Chemistry, published by Gihodo Shuppan, 1988, pp. 1407–1409). Various attempts have thus far been made to produce an alkylester usable as a diesel engine fuel oil from plant oils or fats, or from waste edible oils or fats, as disclosed in Japanese Unexamined Patent Publication Nos. 7-197047 and 7-310090, for example. It has not been possible however to obtain any alkylester complying with current requirements of the Japanese Industrial Standards (JIS) imposed on light oil products by such prior art technology.

Since the transesterification is an equilibrium reaction, a conventional approach to achieving a high yield is to shift the equilibrium state so that a reaction system includes a larger amount of the desired product by using a large quantity of alkylalcohol which is one of raw materials or to removing glycerin which is produced as a result of a side reaction. It is generally understood that gas-phase reaction is advantageous compared to liquid-phase reaction in the transesterification. To add, it is a common practice in the transesterification to use a catalyst for increasing the reaction rate.

In typical industrial processes based on the transesterification, acid catalysts are often used for the production of acetic acid, higher fatty acids, unsaturated carboxylic acids, and so on. For example, protonic acids such as sulfuric acid and phosphoric acid are used as catalysts for the esterification of nonaromatic carboxylic acids while boric acid and phosphoric acid are used as catalysts for the esterification of phenolic acids. Such processes are basically performed in a homogeneous reaction system in which a catalyst is dissolved in a reaction solution. Thus, there exists a problem that it is difficult to separate and recover the catalyst from a liquid end product.

Solid acid catalysts are also used in many cases. For example, $SO_4^{2-}$—$TiO_2$, $TiO_2$—$SiO_2$, $Al_2(SO_4)_3/SiO_2.Al_2O_3$ and sulfonic acid type ion exchange resin are used in the transesterification of terephthalic acid or methacrylic acid. Heteropoly acid is also regarded as a good esterification catalyst. It is known for its ability to be carried by silicon dioxide ($SiO_2$) and activated carbon and exhibit higher activity than $SiO_2$—$Al_2O_3$ or solid phosphoric acid as a gas-phase catalyst. Clay minerals are also used as catalysts. One of advantageous features of these solid acid and mineral catalysts is that they contribute to the simplification of reaction equipment. This is because no special facility is required for separating them from liquid end products. These industrial catalysts have one serious drawback that their activity is low in the transesterification of fats and oils and it has not been possible so far to use them in the aforementioned processes in an industrial scale.

Another previous approach to the use of solid acid catalysts in transesterification of fats and oils is disclosed in Japanese Unexamined Patent Publication No. 6-313188, in which single or composite metallic oxide, metallic sulfate, metallic phosphate, immobilized acid carried by or fixed to a carrier, natural minerals and compounds having a layer structure, solid heteropoly acid, superstrong acid, synthetic zeolite and ion exchange resin are cited as examples of applicable catalysts. However, such potential catalysts of this approach have low catalytic activity in the transesterification of fats and oils as was the case with the earlier-mentioned conventional approaches, and it has been necessary to increase the ratio of a solid acid catalyst in the reaction system or prolong the reaction time in order to achieve high yields.

Also used in the transesterification are basic catalysts, and it is known that metallic alcoholates are effective basic catalysts. Generally used examples of the metallic alcoholates include sodium alcoholate and potassium alcoholate. Other examples used as the metallic alcoholates are sodium hydroxide, potassium hydroxide and sodium carbonate which exhibit high activity in the transesterification of fats and oils. The previously used basic catalysts act only when they are dissolved in a reaction solution like the aforementioned acid catalysts, however. Thus, they remain dissolved in liquid end products and there still exists the problem associated with the difficulty of separating and recovering the catalysts from the liquid end products.

Still another previous approach is to use solid basic catalysts in the transesterification. As an example, Japanese Unexamined Patent Publication No. 62-218495 proposes the use of an ion exchange resin containing a base of the amine group as a solid basic catalyst. Although this approach is not associated with the problem related to the separation and recovery of the catalyst in principle, it involves the use of an excessive amount of alcohol and the reaction is performed at a triglyceride content of 0.1 to 3 wt %. Accordingly, catalytic activity is extremely low and the reaction temperature is limited to 60° C. or less from the viewpoint of the durability of the ion exchange resin and, as a consequence, the approach is not really practical.

SUMMARY OF THE INVENTION

The present invention is intended to overcome the aforementioned problems of prior art technology. It is therefore an object of the invention to provide a method which makes it possible to produce a fatty acid lower alkylester from triglyceride contained in fats and oils at a high reaction efficiency and yet simplify or eliminate the need of separating and recovering a catalyst.

In a method of producing a fatty acid lower alkylester according to a main feature of the invention, a fat & oil and a lower alcohol are caused to react with each other in the presence of a catalyst, in which triglyceride contained in the fat & oil undergoes a transesterification, the catalyst being a solid basic catalyst consisting essentially of a potassium compound and iron oxide, or of a potassium compound and zirconium oxide.

In one preferable form of the invention, the content of the potassium compound in the solid basic catalyst of the invention is 4 to 35 wt % in terms of the weight of potassium.

In another method of producing a fatty acid lower alkylester according to also a main feature of the invention, a fat & oil and a lower alcohol are caused to react with each other in the presence of a catalyst, in which triglyceride contained in the fat & oil undergoes a transesterification, the catalyst being a solid basic catalyst consisting essentially of a calcium compound and iron oxide.

In a preferred form of the invention, the content of the calcium compound in the solid basic catalyst is 4 to 80 wt % in terms of the weight of calcium.

In yet another preferable form of the invention, the transesterification is performed in a fixed bed flow reactor in which the solid basic catalyst is placed in a stationary state.

According to the aforementioned method of the invention, it is possible to produce the fatty acid lower alkylester from triglyceride contained in the fat & oil at a high reaction efficiency as well as to simplify or eliminate the need of catalyst separation and recovery processes. The method of the invention is particularly useful for the production of fatty acid lower alkylester to be used as a diesel engine fuel oil.

These and other objects, features and advantages of the invention will become more apparent upon reading the following detailed description.

DETAILED DESCRIPTION OF THE PREFERRED EMBODIMENTS OF THE INVENTION

The inventors have performed an intensive study from a various points of view to find out a solution of the foregoing problems of the prior art. As a result, it has been found that the aforementioned object of the invention can be accomplished by using a particular catalyst.

What is most characteristic of a method of the invention is the use of particular catalysts, which are solid basic catalysts consisting essentially of a potassium compound and iron oxide, of a calcium compound and iron oxide, or of a potassium compound and zirconium oxide. KOH, $K_2O$ and $K_2CO_3$ are examples of the potassium compound constituting a catalyst. $Ca(OH)_2$, CaO and $CaCO_3$ are the examples of the calcium compound constituting a catalyst. The significant improvement in the efficiency of transesterification has been achieved by using a combination of the aforementioned potassium compound and iron oxide ($Fe_2O_3$, $Fe_3O_4$, FeOOH), or zirconium oxide ($ZrO_2$), or of the aforementioned calcium compound and iron oxide ($Fe_2O_3$, $Fe_3O_4$, FeOOH) as a solid basic catalyst. Contrary to this, such improvement is not achieved if a sodium compound is used instead of the potassium compound. Reasons of the significant improvement in catalytic activity achieved by the use of the aforementioned solid basic catalysts has not fully been revealed yet. Most likely reasons are that potassium has a higher basicity than sodium and could help produce ferrate ($K_2FeO_4$) in a calcination process during the preparation of the catalyst, and that iron oxide serving as a carrier itself also has an active site. On the other hand, in case of using the aforementioned calcium compound, since this compound in nature is water insoluble, it is made possible to limit elution in an oil & fat containing water. As a result, it is assumed that the content of calcium compound in the oil & fat can be increased, resulting in holding a high active state. The use of the aforementioned solid basic catalysts also makes it possible to simplify catalyst separation and recovery processes because constituents of the catalysts do not dissolve into a reaction solution in principle.

It is desirable to apply a high-temperature treatment at a temperature of 500° C. or above in producing the aforementioned solid basic catalysts as the potassium compound first mixed with iron oxide or zirconium oxide by an impregnation process or a kneading process must be dispersed on surfaces of the oxide with great uniformity and produce a solid-phase reaction. Alternative method of producing the solid basic catalysts is as follows: the calcium compound is mixed with iron oxide by an impregnation process or a kneading process and thereafter heat treatment at the temperature of 150° C. or above is applied. Potassium or calcium which has undergone the high-temperature treatment is immobilized on the oxide and exhibits sufficient catalytic activity and movement of active components of the catalyst is prevented during the reaction.

It is preferable that the content of the potassium compound in the aforementioned solid basic catalyst be 4 to 35 wt % in terms of the weight of potassium and the content of the calcium compound in the aforementioned solid basic catalyst be 4 to 80 wt % in terms of the weight of calcium. This is because if the content (wt %) of potassium compound in the solid basic catalyst in terms of potassium weight is less than 4 wt % or the content (wt %) of calcium compound in the solid basic catalyst in terms of calcium weight is less than 4 wt %, the activity of the catalyst is insufficient and, as a consequence, the consumption of the catalyst becomes too large, resulting in a low reaction efficiency. On the other hand, if the content of potassium in the solid basic catalyst exceeds 35 wt %, the potassium compound would agglomerate on the carrier and the number of active sites would decrease, resulting in a reduction in activity or elution of potassium during the reaction, and thereby producing such problems as the need for an additional process for removing potassium from an end product. Further, in case of calcium compound, as mentioned previously, the calcium compound is originally water insoluble, thus the elution of the calcium compound in the oil & fat containing water can be limited and also the compound itself is a solid catalyst, the compound content in the oil & fat can be increased. On the other hand, the compound existing in a mixture state with the iron oxide is suitable in order to retain the catalysts state of the compound, thus the content of the compound in weight percent in terms of calcium should be limited to 80 wt % or lower. Further, the iron oxide is assumed to function as an active catalysts.

The physical shape of the solid basic catalyst is not specifically limited. It may be shaped into tablet form, ring form, pellet form or honeycomb form, for instance. It is preferable, however, that the catalyst be shaped into a form which creates as large an outer surface area as possible of the catalyst.

The solid basic catalyst is not limited in its mode of application. Although the catalyst may be mixed in a whole reaction system, it is preferable to use the catalyst in a fixed bed reactor which will make it possible to perform a continuous reaction and eliminate the need of the catalyst separation and recovery processes. When the method of the invention is carried out continuously in the form of the fixed bed reactor, the flow rate of fat & oil which is allowed to pass through the catalyst should preferably be set to 0.1 to 10/hr in terms of liquid hourly space velocity (LHSV).

In the method of the invention, a fat & oil and a lower alcohol are reacted with each other in the presence of a solid basic catalyst as stated above, in which triglyceride contained in the fat & oil undergoes a transesterification to produce a fatty acid lower alkylester. While the reaction in this method proceeds efficiently even at room temperature, achieving a high rate of esterification reaction, it is needless to say that the reaction may be even accelerated by applying a high pressure. Although the reaction temperature is not specifically limited, it should preferably be lower than the boiling point of the lower alcohol used in the reaction. When using methyl alcohol, for example, the reaction temperature should preferably be within a range of 25° C. to 70° C., and more preferably 55° C. to 65° C.

The earlier-mentioned fats and oils can be used singly or in combination as a raw material in the method of the invention. Although unused fats and oils can be used as a raw material, it is desirable to use waste edible fats and oils to help promote the recycling of resources. While the quality of the fats and oils to be used is not specifically limited, it is desirable that their water and solid contents are as low as possible. From this point of view, it is preferable to preprocess the raw material to remove its water and solid contents if the raw material is a waste edible fat & oil. The waste edible fats and oils could contain large quantities of acid substances. When using a waste edible fat & oil as a raw material, it is preferable to remove it in a preprocessing stage. It is possible to prevent adverse effects on the activity of the solid basic catalyst by the acid substances by adding such a preprocessing stage.

On the other hand, the lower alcohol to be reacted with the fats and oils may be an alcohol whose number of carbon atoms is 1 to 5, such as methyl alcohol, ethyl alcohol, propyl alcohol or isopropyl alcohol. This is because it is essential to use such lower alcohols in order to produce a high-quality lower alkylester suited as a diesel engine fuel oil. A suitable mixing ratio of the lower alcohol to the fat & oil is 10 to 20 wt %.

A reaction product obtained by the transesterification according to the present invention a liquid mixture whose principal constituents are a fatty acid lower alkylester produced by the transesterification of triglyceride contained in the raw material fat & oil with alcohol and glycerin. Although it is possible to employ a stationary bed separation process which utilizes a difference in relative density to separate the fatty acid lower alkylester and glycerin contained in the mixture, this process requires a considerable time to complete, resulting in a deterioration in production efficiency.

Under such circumstances, it is desirable to use the centrifugal separation method for separating the fatty acid lower alkylester and glycerin from each other. A light liquid separated by the centrifugal separation method contains, in addition to the fatty acid lower alkylester constituting a principal constituent, unreacted alcohol, odor-producing components and colored components. A high-purity fatty acid lower alkylester can be eventually obtained if such additional components are removed by adsorption in a later refining process. Examples of adsorbents which may be used in the refining process are activated charcoal, activated carbon fibers, activated clay, bentonite, diatomaceous earth and activated alumina.

The invention is now described in further detail with reference to some practical examples of its embodiment. It is to be understood that the mode of carrying out the invention is not limited to the following practical examples, but various modifications may be made therein within the spirit and scope of the invention.

PRACTICAL EXAMPLE 1

20 g of potassium carbonate and 80 g of iron oxide ($Fe_2O_3$ manufactured by Toda Kogyo Corporation), both in powder form, were mixed and water was added. After sufficiently kneading a resultant mixture, it was dried and calcined at 550° C. for a period of 4 hours. A calcined product was formed into a tablet by using a hydraulic press forming machine and the tablet was cut into pellets measuring 2 to 3 mm long. The pellets were then loaded into a reactor, in which a transesterification was carried out under the following conditions:

| Reaction Conditions | |
| --- | --- |
| Amount of catalyst: | 12 ml |
| Type of fat and/or oil: | Edible rape oil and edible soybean oil (manufactured by The Nissin Oil Mills, Ltd.) |
| Fat/oil flow rate: | 12 ml/hr |
| LHSV: | 10/hr |
| Methyl alcohol to fat/oil ratio: | 13:100 (weight ratio) |
| Reaction temperature: | 60° C. |
| Pressure: | Normal atmospheric pressure |

Beginning at an elapsed time of one hour after starting the reaction, a liquid product obtained was sampled one-hour intervals. Methyl alcohol was removed from 100 ml of the methyl ester group of individual samples by using an evaporator. Then, the viscosity of each sample was measured and each sample was subjected to an mass spectrometric analysis using gas chromatography as the need arises to determine the methyl ester production ratio. The expression "methyl ester production ratio" as used in this Specification means the weight percentage of methyl ester within the methyl ester group including triglyceride. The following conditions were used in the viscosity measurement and mass spectrometric analysis:

| Analysis Conditions | |
| --- | --- |
| Viscosity analyzer: | BL type viscometer (manufactured by TOKIMEK) |
| Gas chromatograph: | Model GC-14B (manufactured by Simadzu Corporation) (i) Detector: FID (ii) Column filler: Silicone OV-1 |

The methyl ester production ratio obtained by an analysis performed three hours after the beginning of the reaction is shown in Table 1.

PRACTICAL EXAMPLE 2

A transesterification was carried out in the same way as Practical Example 1 except that a catalyst was prepared by using zirconium oxide ($ZrO_2$ manufactured by Daiichi Kigenso Kabushiki Gaisha) instead of iron oxide, and the methyl ester production ratio was measured.

PRACTICAL EXAMPLES 3, 4, COMPARATIVE EXAMPLES 1 to 12

Transesterifications were carried out in the same way as Practical Example 1 except that catalysts were prepared by using substances shown in Table 1, and the methyl ester production ratios were measured.

PRACTICAL EXAMPLE 5

15 g of $K_2CO_3$ and 85 g of iron oxide were ground, mixed and kneaded and a resultant mixture was extruded into an elongate cylindrical shape of 3 mm diameter. This cylindrical product was calcined at 700° C. and cut into pellets measuring 3 mm long. A transesterification was carried out in the same way as Practical Example 1 except that these pellets were used a catalyst, and the methyl ester production ratio was measured.

PRACTICAL EXAMPLE 6

33 g of K2CO3 and 67 g of iron oxide were ground, mixed and kneaded and a resultant mixture was extruded into an elongate cylindrical shape of 3 mm diameter. This cylindrical product was calcined at 600° C. and cut into pellets measuring 3 mm long. A transesterification was carried out in the same way as Practical Example 1 except that these pellets were used a catalyst, and the methyl ester production ratio was measured.

PRACTICAL EXAMPLES 7 to 9

Using catalysts as prepared in Practical Examples 5 and 6, transesterification was carried out in the same way as Practical Example 1 except that LHSV was set to 1 or 0.5/hr, and the methyl ester production ratio was measured.

COMPARATIVE EXAMPLES 13, 14

Using faujasite or montmorilonite as a carrier of K2CO3, transesterification was carried out in the same way as Practical Example 1 except that LHSV was set to 1/hr, and the methyl ester production ratio was measured.

The methyl ester production ratios obtained in Practical Examples 1 to 6 and Comparative Examples 1 to 12 are shown in Table 1, and the methyl ester production ratios obtained in Practical Examples 7 to 9 and Comparative Examples 13 and 14 are shown in Table 2.

TABLE 1

| | Catalyst | Methyl ester production ratio (%) |
|---|---|---|
| Practical Example 1 | 20% $K_2CO_3/Fe_2O_3$ | 34.0 |
| Practical Example 2 | 20% $K_2CO_3/ZrO_2$ | 37.0 |
| Practical Example 3 | 20% $KOH/Fe_2O_3$ | 40.0 |
| Practical Example 4 | 20% $KOH/ZrO_2$ | 30.0 |
| Practical Example 5 | 15% $K_2CO_3/Fe_2O_3$ | 44.0 |
| Practical Example 6 | 33% $K_2CO_3/Fe_2O_3$ | 41.0 |
| Comparative Example 1 | 20% $NaCO_3/Fe_2O_3$ | 17.0 |
| Comparative Example 2 | 20% $NaCO_3/ZrO_2$ | 6.0 |
| Comparative Example 3 | 20% $K_2CO_3/Al_2O_3$ | 5.0 |
| Comparative Example 4 | 20% $NaCO_3/TiO_2$ | 17.0 |
| Comparative Example 5 | 20% $K_2CO_3/SiO_2.Al_2O_3$ | 6.5 |
| Comparative Example 6 | 20% $K_2CO_3$/mordenite | 5.0 |
| Comparative Example 7 | 20% $K_2CO_3$/faujasite | 17.0 |
| Comparative Example 8 | $Nb_2O_5$ | 2.0 |
| Comparative Example 9 | $SiO_2$—$Al_2O_3$ | 1.0 |
| Comparative Example 10 | Heteropolyacid/activated charcoal | 1.0 |
| Comparative Example 11 | $AlPO_4$ | 2.0 |
| Comparative Example 12 | Montmorilonite | 2.0 |

TABLE 2

| | Catalyst | LHSV | Methyl ester production ratio (%) |
|---|---|---|---|
| Practical Example 7 | 15% $K_2CO_3/Fe_2O_3$ | 1 | 89.5 |
| Practical Example 8 | 33% $K_2CO_3/Fe_2O_3$ | 1 | 77.0 |
| Practical Example 9 | 15% $K_2CO_3/Fe_2O_3$ | 0.5 | 100.0 |
| Comparative Example 13 | 20% $K_2CO_3$/faujasite | 1 | 26.5 |
| Comparative Example 14 | 20% $K_2CO_3$/montmorilonite | 1 | 31.5 |

PRACTICAL EXAMPLE 10

1500 g of calcium hydroxide and 500 g of iron oxide ($Fe_2O_3$ manufactured by Toda Kogyo Corporation), both in powder form, were mixed in a kneader and added with water. After sufficiently kneading a resultant mixture, the resultant mixture was formed into a cylindrical shape pellet with a ⅛" diameter by using a vacuum extruder. The pellets were heat treated at temperature of 150° C. for five hours to produce the catalyst. Thereafter, the thus obtained catalyst is loaded in the reactor, in which a transesterification was carried out under the condition which is the same as that of the practical example 1 except for a set value of LHSV which in this case is 10 or 0.5. Under the aforementioned condition, the methyl ester production ratio was measured and the measurement results were shown in the following table 3.

TABLE 3

| | Catalyst | LHSV | Methyl ester production ratio (%) |
|---|---|---|---|
| Practical Example 10 | 50% $Ca(OH)_2/Fe_2O_3$ | 1 | 33.0 |
| | | 0.5 | 94.0 |

It is apparent from the above results that the fatty acid lower alkylester was obtained at a high production ratio by the method of the invention using a catalyst consisting essentially of a potassium compound and iron oxide, of a calcium compound and iron oxide, or of a potassium compound and zirconium oxide.

What is claimed is:

1. A method of producing a fatty acid lower alkylester by causing a fat & oil and a lower alcohol to react with each other in the presence of a catalyst, in which triglyceride contained in the fat & oil undergoes a transesterification, said catalyst being a solid basic catalyst consisting essentially of a potassium compound and iron oxide, or of a potassium compound and zirconium oxide.

2. The method according to claim 1, wherein the content of the potassium compound in said solid basic catalyst is 4 to 35 weight % in terms of a weight of potassium.

3. The method according to claim 1, wherein the transesterification is performed in a fixed bed flow reactor filled with said solid basic catalyst in a stationary manner.

4. A method of producing a fatty acid lower alkylester by causing a fat & oil and a lower alcohol to react with each other in the presence of a catalyst, in which triglyceride contained in the fat & oil undergoes a transesterification, said catalyst being a solid basic catalyst consisting essentially of a calcium compound and iron oxide.

5. The method according to claim 4, wherein the content of the calcium compound in said solid basic catalyst is 4 to 80 weight % in terms of a weight of calcium.

6. The method according to claim 4, wherein the transesterification is performed in a fixed bed flow reactor filled with said solid basic catalyst in a stationary manner.

* * * * *